United States Patent [19]
Graham

[11] 4,355,623
[45] Oct. 26, 1982

[54] AIR INLET FUEL SAVER DEVICE FOR INTERNAL COMBUSTION ENGINES

[76] Inventor: Lewis N. Graham, 1864 E. Maxwell St., Pensacola, Fla. 32503

[21] Appl. No.: 238,836

[22] Filed: Feb. 27, 1981

[51] Int. Cl.³ ............................................ F02M 23/04
[52] U.S. Cl. .................................... 123/585; 123/590
[58] Field of Search ................................ 123/585–590; 137/480; 261/DIG. 1, DIG. 38; 48/180 A

[56] References Cited
U.S. PATENT DOCUMENTS

| | | | |
|---|---|---|---|
| 2,017,311 | 10/1935 | Jacobson | 261/DIG. 38 |
| 3,662,724 | 5/1972 | Ohar et al. | 137/480 X |
| 3,799,132 | 3/1974 | MacGuire | 123/587 |
| 3,857,375 | 12/1974 | Jackson | 123/587 |
| 3,866,583 | 2/1975 | Pundt et al. | 123/587 X |
| 4,137,875 | 2/1979 | Medina | 123/585 |

Primary Examiner—William A. Cuchlinski, Jr.
Attorney, Agent, or Firm—Staas & Halsey

[57] ABSTRACT

An auxiliary air inlet fuel saver device for internal combustion engines which includes a body member for mounting between a carburetor and intake manifold of an internal combustion engine which has at least one throat aperture with an auxiliary air inlet hole extending from externally of the body member to the throat aperture, the air inlet hole being at an angle of approximately 45° to the central point of the throat aperture, an adjustable valve aperture directly in line with the center point and meeting with the exit opening of the additional air hole, an adjustable valve member mounted in the valve aperture for controlling the air flow into the body member throat, and hosing connecting to the air filter as usually associated with the engine carburetor for providing filtered air to the device.

5 Claims, 7 Drawing Figures

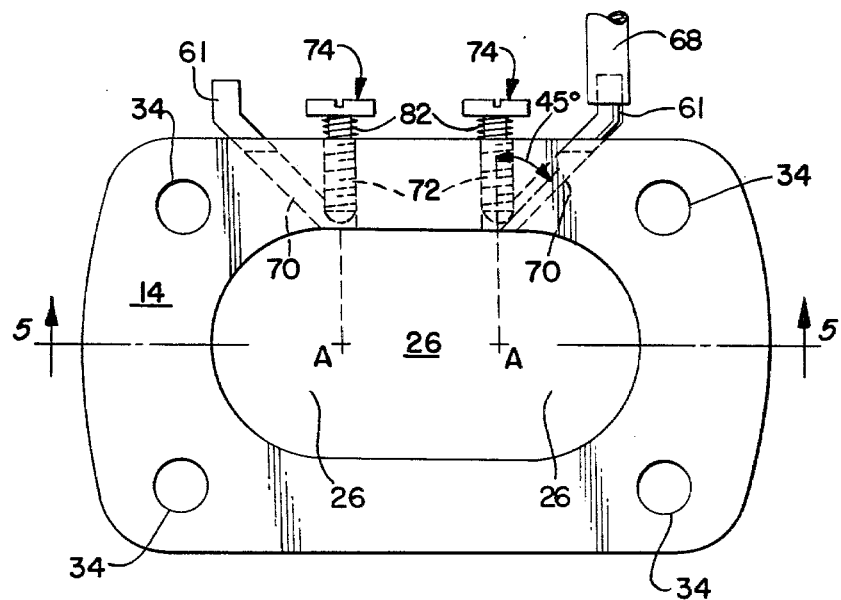
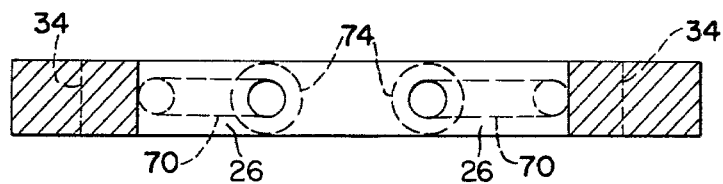
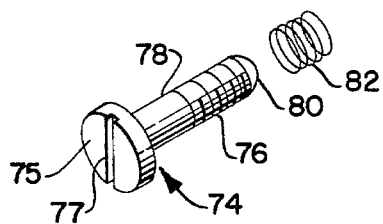

AIR INLET FUEL SAVER DEVICE FOR INTERNAL COMBUSTION ENGINES

BACKGROUND OF THE INVENTION

1. Field of the Invention

This invention relates to an auxiliary air inlet fuel saver device for use between a carburetor and intake manifold of an internal combustion engine.

Most internal combustion engines have a manifold and carburetor system for supplying a fuel-air mixture to the engine combustion areas during normal operation of the engine. However, in the typical internal combustion engine carburetor-manifold system, complete homogenization of the fuel with the air seldom occurs. As a result, small droplets of fuel are generally carried through the manifold and into the combustion chambers of the engine creating an unequal ratio of gas mixture in the combustion areas of the engine as well as impairing complete combustion of the fuel-air mixture because of the presence of the droplets of fuel therein. In extreme cases, even unburned particles of the droplets are emitted in the exhaust without ever being completely burned. This, of course, substantially reduces overall engine efficiency and reduces the power output of the engine. In addition, such particles and other products of incomplete combustion greatly pollute the atmosphere.

2. Description of the Prior Art

Known prior art patents which have attempted to overcome the above-described problems are the following patents: U.S. Pat. No. 3,156,226 (Linn); U.S. Pat. No. 3,414,242 (Bouteleux); U.S. Pat. No. 3,946,710 (Albano et al); U.S. Pat. No. 3,996,315 (Herail) and U.S. Pat. No. 4,137,875 (Medina).

None of these patents offer the new and improved features of the present invention.

For example, the patent to Linn, U.S. Pat. No. 3,156,226 discloses an air intake fitting applied to the carburetor-manifold system of an internal combustion engine. However, this fitting merely permits extra air to enter the manifold, and does not provide the adjustability or high frequency vibrations of the present invention.

The patent to Bouteleux, U.S. Pat. No. 3,414,242 discloses an adapter having adjustable needle valves at right angles to air inlets to the intake system of an internal combustion engine. However, the air channels and needle valves of this patent are substantially perpendicular to each other rather than at 45° and in the same direction as in the present invention.

The Albano et al patent, U.S. Pat. No. 3,946,710 merely discloses an extra air inlet valve connected to the intake manifold and is substantially more complex than the present invention.

The patent to Herail, U.S. Pat. No. 3,996,315 discloses another device installed in the intake manifold, but again the air intake and adjusting needle valve are at right angles to each other.

The patent to Medina, U.S. Pat. No. 4,137,875 discloses an adapter plate having adjustable needle valves with the air intake portions supplied through a separate filter 60, but again the air inlet channels in relationship to the adjustable needle valves is substantially different from that of the present invention.

None of the foregoing listed prior art patents, nor any other prior art references known to applicant, teach a device like that of the present invention.

SUMMARY OF THE INVENTION

An object of the present invention is to provide a new and improved auxiliary air inlet device for internal combustion engines mountable between the carburetor and the intake manifold of the engine.

Another object of this invention is to provide an auxiliary air inlet device usable with either single or multiple barrel carburetors for substantially increasing the operating efficiency of the engine with which the carburetor is used.

A further object of this invention is to provide an adapter which may be added to present internal combustion engines between the carburetor and manifold thereof for substantially increasing the overall efficiency of these engines.

Another further object of this invention is to provide an adapter plate or body member having air inlet holes or channels leading into an intake throat aperture centrally located on the plate at an angle of substantially 45° thereof, and in addition having an adjustable valve member with a rounded, blunted tip end adjustable directly into and out of a threaded aperture perpendicular to the body member throat aperture.

Another further object is to provide an adapter which will greatly increase the homogenization of the fuel-air mixture by the use of an adjustable valve member having an air diverting blade instead of just a rounded, blunted end for creating further air disturbance in the exit of the associated auxiliary air holes.

Another still further object of the present invention is to provide air filtering passage of the auxiliary air through the existing carburetor air filter to substantially reduce the possibility of any contaminants being drawn into the engine through the auxiliary air inlets of this device.

The foregoing and other objects of the present invention are achieved by providing a plate-like body member for mounting between a carburetor and a manifold of an internal combustion engine. This body member has at least one central opening for at least a single barrel carburetor, or an extended central opening for a two-barrel carburetor. Of course, double apertures may be provided for four-barrel type carburetor systems. Each aperture portion is provided with an auxiliary air inlet hole and an adjustable valve member or modified valve member for controlling or changing the amount of auxiliary air drawn into the engine. In turn, each auxiliary air inlet hole is connected through suitable flexible hoses to the carburetor air filter so that the possibility of bringing contaminant particles into the engine through the auxiliary hole or holes is substantially reduced without the use of any additional filter equipment.

Also, an important feature of the present invention is in the fact that the auxiliary inlet holes point in the same direction as the adjustable valves and are at approximately a 45° angle thereto. Furthermore, the adjustable valve members point directly into the plate aperture while the auxiliary air inlet holes point into the throat aperture of the body member at an angle of approximately 45°.

In a modified embodiment, the adjustable valve member is provided with a blade at the tip thereof which extends into the exit portion of the auxiliary air inlet hole and effects and creates a great disturbance of the additional air being sucked into the engine. This additional swirling, vibration, twisting, and tumbling of the additional air together with a creation of high frequency waves, some of them audible and others too high to be audible, greatly increase the homogenization of the fuel with the air and eliminate fuel droplets passing into the combustion areas of the engine.

These together with other objects and advantages which will become subsequently apparent reside in the details of construction and operation as more full hereinafter described and claimed, reference being had to the accompanying drawings forming a part hereof, wherein like numerals refer to like parts throughout.

BRIEF DESCRIPTION OF THE DRAWINGS

FIG. 4 is a top plan view of the body member.

FIG. 5 is a cross sectional elevation taken along lines 5—5 of FIG. 4.

FIG. 6 is a perspective view of an adjusting screw of one embodiment of the present invention.

FIG. 7 is a perspective view of an adjusting screw of another embodiment of the present invention.

DESCRIPTION OF THE PREFERRED EMBODIMENTS

Figure 1:
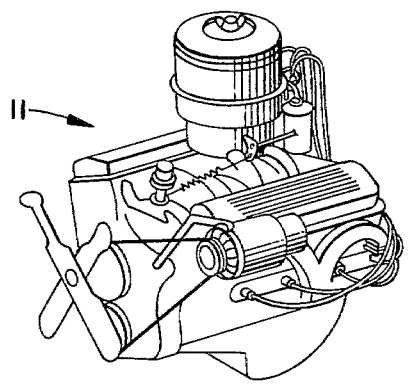
FIG. 1 shows a typical type internal combustion engine with which the present invention is intended for use.

Referring now to the drawings, FIG. 1 shows a typical type internal combustion engine with which the present invention is intended to be used. The invention as installed is indicated generally by reference numeral 11 in this figure.

Figure 2:
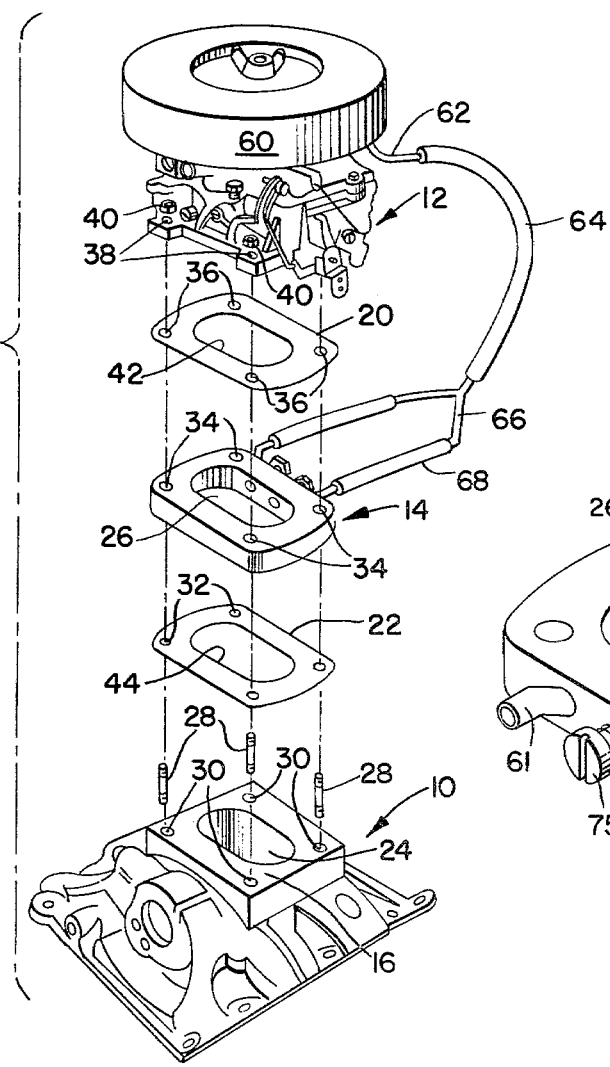
FIG. 2 is an exploded perspective view of the present invention in a typical installation between the carburetor and intake manifold of the internal combustion engine.

FIG. 2 shows an exploded perspective view of an actual installation of the present invention between a typical engine intake manifold 10 and a two-barrel carburetor 12. The body member 14 is normally installed between the carburetor and intake manifold by the use of gaskets 20 and 22.

In a typical intake manifold, a smooth and accurate upper surface 16 is provided with a plurality of studs 28 in threaded holes 30. The studs 28 are for the purpose of mounting carburetor 12 by means of the holes 38 and nuts 40 as shown. The upper gasket 20 is normally provided with apertures 36 for receiving studs 28, and similarly the lower gasket 22 is provided with apertures 32 for the same purpose. The body member 14 is also provided with similar apertures 34 for mounting of the body member upon the engine manifold. A body member 14 is provided with a central enlarged aperture 26 and it is in this portion of the adapter that the improved results as effected by the present invention take place. Of course, the intake manifold 10 has an intake aperture 24, and gaskets 20 and 22 have similar flow-through apertures 42 and 44.

As best seen in FIG. 2, the auxiliary air inlets of the body member 14 are connected by a flexible hose 64 to a short connection tubing 62 attached to a conventional air filter 60 for the carburetor intake. Normally the tubing 62 is attached to the air filter on the carburetor intake side of this filter so that the air being taken into the auxiliary inlets is air that has been filtered by the present air filter. This feature of the present invention eliminates the necessity for additional air filters which are needed by so many prior art devices. Of course, filtration of the air for the auxiliary inputs is very important, otherwise unwanted contaminants very likely will be drawn into the intake manifold of the engine with subsequent internal damage to the engine.

Some of the known prior art devices with auxiliary air inputs omit any filter system whatsoever, but this over any extended period of use can be quite harmful to the engine and substantially shorten the operating life thereof. However, when additional air filters are used, they increase the overall complexity of the basic system, and also the expense thereof.

The hose 64 is normally connected to a Y member 66 and short coupling hoses 68 to each of the auxiliary air inputs in the case of two or four-barrel carburetor systems. Obviously, if only a single barrel carburetor is being used, then hose 64 can connect directly to a single auxiliary air input (not shown) in the same manner as depicted herein.

Figure 3:
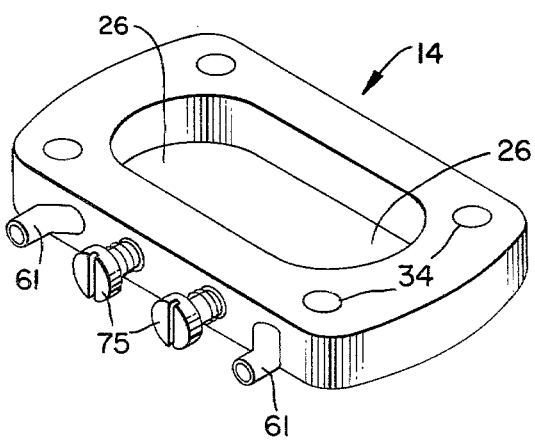
FIG. 3 is a perspective view of the body member with auxiliary air inlets and adjusting valves of the present present invention.

Looking at FIGS. 3-5, the adapter will now be described in more detail. The body member 14 will normally be manufactured in a number of different sizes to fit many different sizes of intake manifolds and carburetor systems. Obviously, the intake apertures for a two-barrel carburetor 26 and 26 as shown in these FIGS. will be decreased to one for a single barrel carburetor system, and increased to four in case of a four-barrel carburetor. In the four-barrel version, normally the structure will be in the form of two double apertures. That is, a second double aperture like the one already shown in FIGS. 3 and 4, will be provided in an extended portion of the body member 14.

For the two-barrel version shown, dual auxiliary air inlets 70 are provided with dual adjusting valve apertures 72 associated therewith. The apertures 72 are provided with internal threads and are normal or directly in line with the body apertures 26. That is, they basically are directly in line with the center line of the dual apertures 26 and 26 as best seen in the plan view of FIG. 4. This positioning, while simple is very important to the present invention. Each inlet 70 opens into the associated adjusting valve openings 72, but the direction of each channel is substantially at 45° to the center line of the adjusting valve hole 72. Thus, the auxiliary air being sucked through each of the inlets 70 will strike the tip of the adjusting valve associated therewith at an angle and thus be disturbed thereby, and also effectively accelerated by the reduced opening caused by the tip partially blocking the exit opening, and also be swirled, turned, twisted, and otherwise disturbed into turbulent motion.

Each auxiliary inlet 70 is normally provided with a short piece of stub tubing 61 of copper, or similar metal, press fitted thereinto, at the entrance or inlet end of each inlet. In turn, short pieces of hose 68 which connect to the Y member 66 described above, or else in the case of a single carburetor directly to the hose 64 for the purpose of supplying the fitted auxiliary air input into the auxiliary inlets 70.

Looking at FIG. 6, an adjusting valve 74 is shown. A knurled head 75 is normally provided with a conventional screwdriver slot 77 therein, a threaded body portion 76, and a slightly reduced body portion 78 tapering to a blunted, rounded end tip 80. Generally, a spring 82 is used in conjunction with the adjusting valve to assure that once adjusted, the adjustment will be retained.

During operation of the internal combustion engine with the body member of the present invention installed, the auxiliary air being sucked through an inlet 70, after filtration through the air filter 60, will enter the throat 26 of the body member 14 at an angle of approximately 45° to the center line axis of the throat and at approximately 45° to the tip of the adjusting valve. This creates a very effective swirling, twisting, turning, disturbed and violent turbulence of the auxiliary air at a greatly increased speed from that of the flow of fuel-air mixture through the throat 26. Thus, this violently moving disturbed air will cause any unhomogenized droplets of fuel to be broken up and dispersed throughout the existing mixture into a resulting much better homogenized mixture.

FIG. 7 shows a modified embodiment of the adjusting valve wherein the end tip 80 is modified by the addition of a small baffle plate or deflector blade 85. This adjusting valve 74' has a main threaded body 76', a slotted head 75', elongated body portion 78', and tip portion 80'. The purpose of the deflector blade 85 is to enhance and greatly increase the disturbance of the auxiliary air through the associated air inlets 70. While the blunt nose portion 80 of the FIG. 6 version will greatly increase the homogenization of the fuel-air mixture flowing through the associated throat 26, by the use of the modified auxiliary valve having the deflector blade 85 thereon, this effect is increased even more. Also, because the blade will be at various angles to the flow of the auxiliary air as the adjusting valve is turned, the overall adjusting effect is much greater and substantially increased over that of the blunted nose embodiment of FIG. 6.

Also, it is believed that when using the deflector blade 85, a high frequency disturbance is effected which is in the audible range as well as in the higher than audible range which apparently also greatly increases the effect of the present invention, and greatly increases the increased homogenization of the fuel-air mixture.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

I claim:

1. An auxiliary air device for use between the carburetor and intake manifold of an internal combustion engine comprising:
   a body member of pre-determined thickness;
   an aperture in the body member for alignment with a carburetor throat and the intake manifold when assembled therewith for passage of fuel through said aperture;
   at least one inlet opening provided through said body member from said aperture to the outside thereof;
   said at least one inlet opening being at a predetermined angle with respect to said body member aperture;
   adjustable valve means associated with said inlet opening adjacent the body member throat aperture,
   further means for providing filtered air from the carburetor, intake to said inlet opening,
   said adjustable valve means including a threaded aperture substantially directly in line with the center line of the body member aperture and at approximately 45° to the axis of said auxiliary air inlet opening, and adjustable valve member provided within said threaded aperture of the adjustable valve means,
   said adjustable valve member having a rounded and blunted end for the purpose of effecting disturbance of the auxiliary air as blowing through the at least one auxiliary air as blowing through the at least one auxiliary air inlet, and further said adjustable valve member having a deflecting blade portion at the rounded and blunted end extremity thereof for the purpose of effecting violent turbulence of the air being sucked through the auxiliary air inlet opening and also for the purpose of creating vibration sound effects.

2. In combination with an internal combustion engine having an intake manifold and a carburetor with air filter for mixing fuel and air together prior to induction into the engine combustion area comprising: an auxiliary body having a throat aperture therein for alignment between and with the carburetor and intake manifold openings, at least one auxiliary air inlet hole orientated at a pre-determined angle between the auxiliary body throat aperture and the exterior thereof, valve adjusting means associated with said auxiliary air inlet hole at another predetermined angle thereto, and provided with adjusting means therein for effecting violent turbulence of air flowing through the auxiliary hole at the exit thereof in addition to creating high frequency sound vibrations therein for the purpose of increasing the homogenization of fuel-air mixture with resultant increase in engine efficiency, said adjusting means including a valve member having a rounded blunted end which projects into the exit opening of said auxiliary air inlet hole, and said adjusting means further including said valve member having a deflecting blade at the rounded blunted end extremity thereof for the purpose of effecting violent turbulence of the air being sucked through the auxiliary air inlet hole exist and also for the purpose of creating vibration sound effects.

3. The structure as set forth in claim 2, together with further means for providing filtered air to said auxiliary air inlet hole from said carburetor air filter.

4. The structure as set forth in claim 3, wherein said further means includes a connecting hose from the carburetor air filter to the auxiliary air inlet holes.

5. The structure as set forth in claim 4, wherein said auxiliary body is provided with a plurality of throat apertures and auxiliary air inlet holes with adjusting means.

* * * * *